United States Patent [19]

Ray

[11] 3,776,466
[45] Dec. 4, 1973

[54] POLYURETHANE FOAM INSERT FOR OVEREXPANDED ROCKET ENGINE NOZZLES TO PREVENT START TRANSIENT SIDELOADS

[76] Inventor: William L. Ray, 229 Richmond Dr., N.W., Huntsville, Ala. 35811

[22] Filed: Jan. 19, 1973

[21] Appl. No.: 324,946

[52] U.S. Cl............. 239/265.15, 60/200 A, 60/204
[51] Int. Cl............................................. B64d 33/04
[58] Field of Search.................. 239/265.11, 265.15; 60/200 A, 204

[56] References Cited
UNITED STATES PATENTS
3,228,334   1/1966   Oss ........................... 239/265.15 X
3,253,403   5/1966   Hayes ........................... 239/265.15
3,352,495   11/1967  Fischer ......................... 239/265.15

Primary Examiner—M. Henson Wood, Jr.
Assistant Examiner—John J. Love
Attorney—L. D. Wofford, Jr. et al.

[57] ABSTRACT

A polyurethane foam insert is adhesively secured within the nozzle of a regenerative cooled rocket engine. The insert has a central bore which reduces the engine throat to nozzle exit area ratio so as to prevent dangerous sideloads during normal or extended engine start transient periods at sea level conditions, but quickly erodes in a few seconds to permit normal engine operating conditions which follows the start transient period.

6 Claims, 2 Drawing Figures

PATENTED DEC 4 1973  3,776,466

POLYURETHANE FOAM INSERT FOR OVEREXPANDED ROCKET ENGINE NOZZLES TO PREVENT START TRANSIENT SIDELOADS

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to a technique for preventing excessive start transient sideloads normally generated by rocket engines having overexpanded nozzles when started substantially at sea level conditions. More particularly, it relates to the use of a temporary insert placed within the nozzle, which insert rapidly erodes away during the engine start transient period but prevents that exhaust gas flow separation from the nozzle wall during this period that causes dangerous sideloads.

The starting at sea level conditions of rocket engines designed for high altitude operation, is accompanied by substantial sideloads sufficient to damage the engine and supporting flight structure. At present the ground testing of such engines is accomplished by the use of high altitude simulators or mechanical restrainers. High altitude simulators are in the form of pressure evacuated chambers and diffusers and they involve a high investment and operational costs. Mechanical restrainers consist of large ground mounted steel arms attached to a special bridle fastened to the engine.

None of the above ground testing devices have been utilized for actual launch operations. In practice rocket engines herebefore designed for high altitude starts were not used for ground launch operations.

Accordingly, it is an object of the present invention to provide a simple low cost expedient to allow safe sea or ground level starts of rocket engines designed for high altitude operation.

SUMMARY OF THE INVENTION

The present invention is a plastic foam insert for an overexpanded rocket nozzle that allows the exhaust gases to flow full in the nozzle and thereby prevents that uneven gas exhaust flow separation that produces dangerous sideloads. The insert is fitted to the inside wall of the particular rocket nozzle and has a central bore axially aligned with that of the rocket nozzle.

The plastic foam material of the insert is selected so it may be eroded by the rocket exhaust gases in a smooth, uniform manner and at a rapid rate so as to be totally gone from the nozzle in a few seconds. Rigid polyurethane foam material has been found to be a satisfactory material.

While the use of an ablative liner for uncooled rocket nozzles for heat protection purposes is known and it has been recognized that ablation of the liner could automatically be used to change the ratio of the exit area to the area of the throat (see U.S. Pat. No. 3,253,403) no one has suggested the use of a plastic foam material so as to prevent sideloads during the initial start period which last only a few seconds. With the use of cryogenic liquid regenerative cooled engines, the insert material selected according to the present invention would be critical as engine operation depends upon the heat imput from the combustion gases to the fluid within the nozzle wall to prevent pump stall. The insert must be eroded away before the cryogenic fluid within the nozzle wall becomes too cold. The use of polyurethane foam avoids this problem with regenerative cooled engines because it quickly erodes away during the engine start transient to eliminate its insulation effect before the fluid can reach the colder temperatures.

There is a great difference in the engine expansion ratio required for minimum sideload start and that required for mainstage or normal operation at sea level. For instance, the J-2 engine of North American Rockwell Corporation requires an expansion ratio of approximately 15:1 for a minimum sideload start at sea level conditions but will safely operate during mainstage at a 27.5:1 expansion ratio. If the J-2 engine could not convert back to the 27.5:1 expansion ratio within a few seconds after starting the engine, performance would be reduced because of the underexpanded nozzle condition and the added weight of the liner.

The foregoing and objects, features, and advantages of the invention will be apparent from the following detailed description of a preferred embodiment as illustrated in the accompanying drawing.

DESCRIPTION OF A PREFERRED EMBODIMENT

Figure 2:
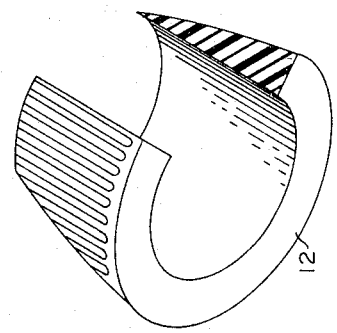
FIG. 2 is a view of the plastic foam insert with a quarter section removed.
Figure 1:
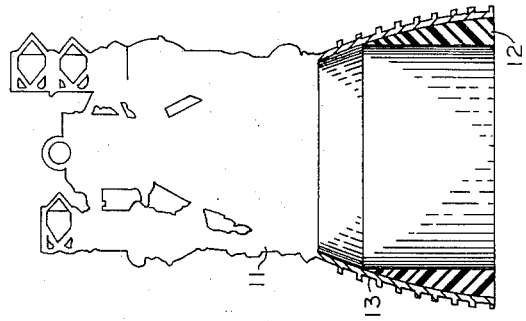
FIG. 1 is a partial sectional view of a typical regenerative cooled rocket engine with an insert of plastic foam material according to the invention.

In FIG. 1 there is shown a regenerative cooled rocket engine 11 having an insert 12 of rigid polyurethane foam closely fitted and glued with an adhesive to the inside of the engine's bell shaped nozzle 13. The insert 12 has an axially aligned central bore which temporarily changes the engine expansion ratio to that which will give a minimum sideload start. A suitable adhesive for holding the insert 12 in the engine nozzle 13 is that specified by Narmco Industries Laboratories as 7343, which is a polyurethane adhesive suitable for cryogenic uses.

Test of the insert 12 was accomplished using a full scale J-2 rocket engine. This engine has an expansion ratio of 27.5:1 with a throat diameter of 14.5 inches and a nozzle exit diameter of 77 inches. Nominal thrust rating is 230,000 lbs. The insert 12 as used for one test was a one-piece cylindrical polyurethane foam molded to fit the interior of the J-2 bell shaped nozzle. The insert had an outside diameter at the base of 77 inches, an outside diameter at the top of 51 inches, a central bore diameter of 51 inches and a bore length of 46 inches. When installed in the engine the insert 12 changed the expansion ratio from 27.5:1 to 15.0:1.

Tests which were made proved that the insert would satisfactorily prevent engine start transient sideloads. The sideloads during start transient were less than ± 3,000 pounds where normally the J-2 engine sideloads reach ± 20,000 to 30,000 pounds before the nozzle flows full. A polyurethane foam having a density of six pounds per cubic foot and 10 pounds per cubic foot were both satisfactory but the erosion rate is faster for the lower density. A density exceeding 10 pounds per cubic foot may be used if greater structural integrity is required.

The fabrication process of the insert 12 consists of either spraying or pouring the liquid polyurethane components into a mold and allowing the foam material to cure for a specified period of time. The mold having a side wall molding surface which is a duplicate of the inner side surface of the rocket nozzle. Following the fabrication process the exterior of the insert 12 is coated with a suitable adhesive and inserted into the engine nozzle.

The insert 12 should closely fit the nozzle wall 13 so that the adhesive used to glue the insert within the chamber makes 100 percent contact and no voids exist between the insert 12 and the nozzle chamber wall 13. The insert plastic foam material should be of uniform density and free of cavities and cracks.

The use of polyurethane foam material for the insert 12 is unique in that it is used as a type of ablator. This foam material starts to fail structurally at temperatures of approximately 250°F to 300°F but the failure results in melting of the heat exposed surface only and does not effect the entire bulk due to the excellent insulation qualities of the material. The low melting temperature is believed to account for the smooth erosion process during the several seconds (2 to 10 seconds) that the insert remains in the engine chamber.

The use of the insert 12 for rocket engines such as the Orbiter of the future space shuttle currently being developed which are to be started at the time of ground launch will offer many advantages. The insert does not require pad prelaunch checkout or servicing nor additional instrumentation and control systems. The engine weight which is normally required to structurally reinforce the engine to withstand excessive sideloads may be allocated to increase payloads of the vehicle.

What is claimed is:

1. In a rocket engine having a nozzle with an expansion ratio greater than required for a minimum sideload start, the improvement comprising:
   a temporary insert of plastic foam material secured within said rocket nozzle,
   said insert having an exterior side surface closely fitted to the interior side surface of said rocket nozzle, and having a central bore extending between its upper and lower ends which effectively reduces the expansion ratio of said nozzle to that required for a minimum sideload start.

2. In a rocket engine according to claim 1 wherein is said plastic foam material is rigid polyurethane foam.

3. In a rocket engine according to claim 2 wherein said polyurethane foam has a density approximately in the range of six to 10 pounds per cubic foot.

4. In a rocket engine according to claim 1 wherein said nozzle is of the cryogenic liquid regenerative cooled type.

5. In a regenerative cooled rocket engine having a nozzle with an expansion ratio greater than required for a minimum side-load start, the improvement comprising:
   a molded polyurethane foam insert having an exterior side surface adhesively secured to the inner side surface of said rocket nozzle,
   said insert having a central bore extending between its upper and lower ends, which bore is axially aligned with said rocket nozzle so as to effectively reduce the expansion ratio of said nozzle to that required for a minimum sideload start, and
   said polyurethane foam having a density which allows the insert to be totally eroded away in a few seconds when subjected to the hot exhaust gases of said rocket engine.

6. A method of obtaining minimum sideload starts in an overexpanded rocket nozzle, comprising:
   molding an insert for said engine nozzle from plastic foam material which will quickly erode away in a few seconds when subjected to the hot exhaust gases flowing in said rocket nozzle,
   said insert having a molded side exterior surface complementary to the side inner surface of said rocket nozzle, and a central bore extending between its upper and lower ends which is designed to reduce the expansion ratio of said rocket nozzle so as to give a minimum sideload start,
   coating the side exterior surface of said insert with an adhesive,
   placing said insert into said rocket nozzle whereby its bore is axially aligned with that of said nozzle and its side surface is in continuous contact with the side inner surface of said nozzle, and
   allowing said adhesive to glue said insert to the side inner surface of said nozzle.

* * * * *